Sept. 25, 1956      G. LANGE      2,764,062

THREE COMPONENT PHOTOGRAPHIC OBJECTIVE

Filed July 8, 1953

United States Patent Office 2,764,062
Patented Sept. 25, 1956

2,764,062

THREE COMPONENT PHOTOGRAPHIC OBJECTIVE

Günther Lange, Konigsbronn, Germany, assignor to Carl Zeiss, Heidenheim (Brenz), Germany Application July 8, 1953, Serial No. 366,695

Claims priority, application Germany July 22, 1952

1 Claim. (Cl. 88—57)

Photographic objectives are known which consist of three components, separated from one another by air spaces, of which the two outer components are collective and consist each of two individual lenses of opposite refractive power cemented together with one another, while the middle component is an uncemented unsymmetrical dispersing lens, the radius of the front surface of which being at least 1.5 times as long as the radius of its rear surface, and wherein the cemented front component has the shape of a meniscus and the cemented surface of the rear component turns the convex side towards the diaphragm. The invention concerns in particular objectives of this construction, in which the radius of curvature of the front surface of the front component is greater than the 0.3 fold amount of the objective focal length. Such objectives are characterized, in so far that the relative aperture is not too great, by a high sharpness of image over the entire image field. With larger relative aperture residual errors arise which impair the image sharpness.

The measures in accordance with the invention now serve in the first place to eliminate most extensively these errors also with relative apertures of at least 1:3.5, especially thereby to attain a good flattening of the image field. These measures consist therein, that the dispersing uncemented middle lens is made of a material having lower refractive index $n_D$ than the arithmetic mean of the $n_D$ values of all other glasses employed in the objective, and that at the same time the following conditions are fulfilled:

$$0.3 \cdot f < r_1 < 0.6 \cdot f$$
$$1.0 \cdot f < r_3 < 5.5 \cdot f$$
$$1.5 \cdot r_5 < r_4 < 5.0 \cdot r_5$$
$$0.7 \cdot f < r_4 < 1.0 \cdot f$$
$$0.35 \cdot f < r_7 < 0.8 \cdot f$$
$$0.45 \cdot f < r_8 < 0.7 \cdot f$$
$$0.35 \cdot f < L < 0.4 \cdot f$$
$$a < b$$

$r_1 \ldots r_8$ being the radii of curvature of the element surfaces beginning with the front side, $a$ and $b$ being the air spaces between said divergent component and said convergent front component and said convergent rear component respectively, $f$ being the equivalent focal length of the objective and $L$ being the overall length of the objective. Thereat it is advantageous to make the collective lens of the cemented front component of a glass with an $n_D$ value greater than 1.660.

Figure 1:
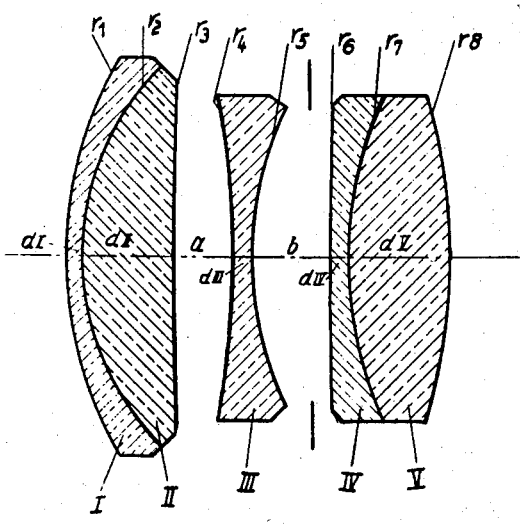
Figure 2:
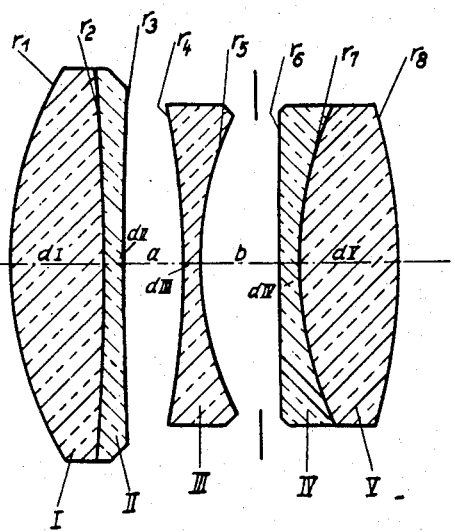

A preferred practical construction of objective according to the present invention is illustrated in the accompanying drawing Figures 1 and 2, and numerical data for two convenient practical examples of this construction are given in the following tables, in which $r_1$, $r_2$ ... represent the radii of curvature of the individual surfaces counting from the front (the positive sign indicating that the surface is convex and the negative sign that it is concave thereto) $d_I$, $d_{II}$ ... represent the axial thickness of the various elements, and $a$, $b$, represent the axial air separations between the components. The tables also give the mean refractive indices for the D-line and the Abbe numbers $v_D$ of the materials used for the individual elements. The two execution examples in accordance with the invention, which are both computed for a relative aperture of 1:2.8.

The effective image field in both examples amounts to ±26°, the specified radii $r$, thicknesses $d$, and intervals $a$; $b$ hold for a focal length of the objective of about 100 mm.

1. Example (Fig. 1)

| Radii | Thicknesses and spaces | $n_D$ | $v_D$ |
|---|---|---|---|
| $r_1 = +\ 38.267$ | $d_I = 1.895$ | 1.72342 | 38.0 |
| $r_2 = +\ 25.576$ | $d_{II} = 8.971$ | 1.71700 | 47.9 |
| $r_3 = +\ 448.298$ | $a = 5.812$ | | |
| $r_4 = -\ 82.048$ | $d_{III} = 1.706$ | 1.62536 | 35.6 |
| $r_5 = +\ 33.138$ | $b = 7.770$ | | |
| $r_6 = +4482.980$ | $d_{IV} = 1.769$ | 1.58144 | 40.8 |
| $r_7 = +\ 38.822$ | $d_V = 9.729$ | 1.71700 | 47.9 |
| $r_8 = -\ 55.631$ | | | |

2. Example (Fig. 2)

| Radii | Thicknesses and spaces | $n_D$ | $v_D$ |
|---|---|---|---|
| $r_1 = +\ 38.167$ | $d_I = 8.947$ | 1.71700 | 47.9 |
| $r_2 = -\ 251.440$ | $d_{II} = 1.890$ | 1.71736 | 29.5 |
| $r_3 = +\ 422.115$ | $a = 5.860$ | | |
| $r_4 = -\ 81.832$ | $d_{III} = 1.537$ | 1.62536 | 35.6 |
| $r_5 = +\ 33.050$ | $b = 7.750$ | | |
| $r_6 = +\ 4471.17$ | $d_{IV} = 1.764$ | 1.58144 | 40.8 |
| $r_7 = +\ 38.720$ | $d_V = 9.703$ | 1.71700 | 47.9 |
| $r_8 = -\ 55.485$ | | | |

I claim:

An optical objective corrected for spherical and chromatic aberrations, coma, astigmatism, field curvature and distortion, and comprising a simple divergent component, and two compound convergent components located one on each side of such divergent component and each consisting of a convergent element cemented to a divergent element, said middle divergent component being a single uncemented unsymmetrical biconcave lens element, the said cemented convergent component located at the front side having meniscus shape, the cemented surface in the said convergent rear component being convex towards the said middle component, the said divergent middle component being made of a material having lower refractive index $n_D$ than the arithmetic mean of the $n_D$ values of all other materials in the objective, and the following conditions being fulfilled:

$$0.3 \cdot f < r_1 < 0.6 \cdot f$$
$$1.0 \cdot f < r_3 < 5.5 \cdot f$$
$$1.5 \cdot r_5 < r_4 < 5.0 \cdot r_5$$
$$0.7 \cdot f < r_4 < 1.0 \cdot f$$
$$0.35 \cdot f < r_7 < 0.8 \cdot f$$
$$0.45 \cdot f < r_8 < 0.7 \cdot f$$
$$0.35 \cdot f < L < 0.4 \cdot f$$
$$a < b$$

$r_1 \ldots r_8$ being the radii of curvature of the element surfaces beginning with the front side, $a$ and $b$ being the air spaces between said divergent component and said convergent front component and said convergent rear component respectively, $f$ being the equivalent focal length of the objective, and $L$ being the overall length of the objective.

References Cited in the file of this patent

UNITED STATES PATENTS

| | | |
|---|---|---|
| 765,006 | Harting | July 12, 1904 |
| 766,036 | Harting | July 26, 1904 |
| 1,421,156 | Booth | June 27, 1922 |
| 2,417,736 | Cox | Mar. 18, 1947 |
| 2,645,156 | Tronnier | July 14, 1953 |

FOREIGN PATENTS

| | | |
|---|---|---|
| 535,480 | Great Britain | Apr. 10, 1941 |